United States Patent
Romanovsky et al.

(10) Patent No.: US 11,733,172 B2
(45) Date of Patent: Aug. 22, 2023

(54) APPARATUS AND METHOD FOR ROTATING AN OPTICAL OBJECTIVE

(71) Applicant: KLA Corporation, Milpitas, CA (US)

(72) Inventors: Anatoly Romanovsky, Palo Alto, CA (US); Jenn-Kuen Leong, San Jose, CA (US); Daniel Kavaldjiev, San Jose, CA (US); Chunhai Wang, Pleasanton, CA (US); Bret Whiteside, Gilroy, CA (US); Zhiwei Xu, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 6 days.

(21) Appl. No.: 17/313,703

(22) Filed: May 6, 2021

(65) Prior Publication Data

US 2021/0356406 A1 Nov. 18, 2021

Related U.S. Application Data

(60) Provisional application No. 63/025,192, filed on May 15, 2020.

(51) Int. Cl.
*G01N 21/88* (2006.01)

(52) U.S. Cl.
CPC . *G01N 21/8806* (2013.01); *G01N 2021/8822* (2013.01); *G01N 2201/063* (2013.01)

(58) Field of Classification Search
CPC ....... G01N 2021/8822; G01N 21/8806; G01N 2201/063; G01N 21/9501
USPC ....................... 356/237.1–237.6, 239.1–239.8
See application file for complete search history.

(56) References Cited

U.S. PATENT DOCUMENTS

| | | | |
|---|---|---|---|
| 9,176,072 | B2 | 11/2015 | Zhao et al. |
| 10,739,275 | B2 | 8/2020 | Zhao et al. |
| 2003/0210393 | A1 | 11/2003 | Vaez-Iravani et al. |
| 2007/0013901 | A1* | 1/2007 | Kim ................... G01N 21/9501 356/237.2 |

(Continued)

FOREIGN PATENT DOCUMENTS

| | | |
|---|---|---|
| EP | 0857316 B1 | 2/2002 |
| JP | 2000097872 A | 4/2000 |

OTHER PUBLICATIONS

PCT International Search Report and Written Opinion for International Application No. PCT/US2021/031662 dated Sep. 1, 2021, 11 pages.

*Primary Examiner* — Tri T Ton

(74) *Attorney, Agent, or Firm* — Suiter Swantz pc llo

(57) ABSTRACT

A dark-field optical system may include a rotational objective lens assembly with a dark-field objective lens to collect light from a sample within a collection numerical aperture, where the dark-field objective lens includes an entrance aperture and an exit aperture at symmetrically-opposed azimuth angles with respect to an optical axis, a rotational bearing to allow rotation of at least a part of the dark-field objective lens including the entrance aperture and the exit aperture around the optical axis, and a rotational driver to control a rotational angle of the entrance aperture. The system may also include a multi-angle illumination subsystem to illuminate the sample with an illumination beam through the entrance aperture at two or more illumination azimuth angles, where an azimuth angle of the illumination beam on the sample is selectable by rotating the objective lens to any of the two or more illumination azimuth angles.

38 Claims, 9 Drawing Sheets

(56) References Cited

U.S. PATENT DOCUMENTS

2011/0194176 A1\* 8/2011 Behrend ............ A61B 5/0059
359/387

\* cited by examiner

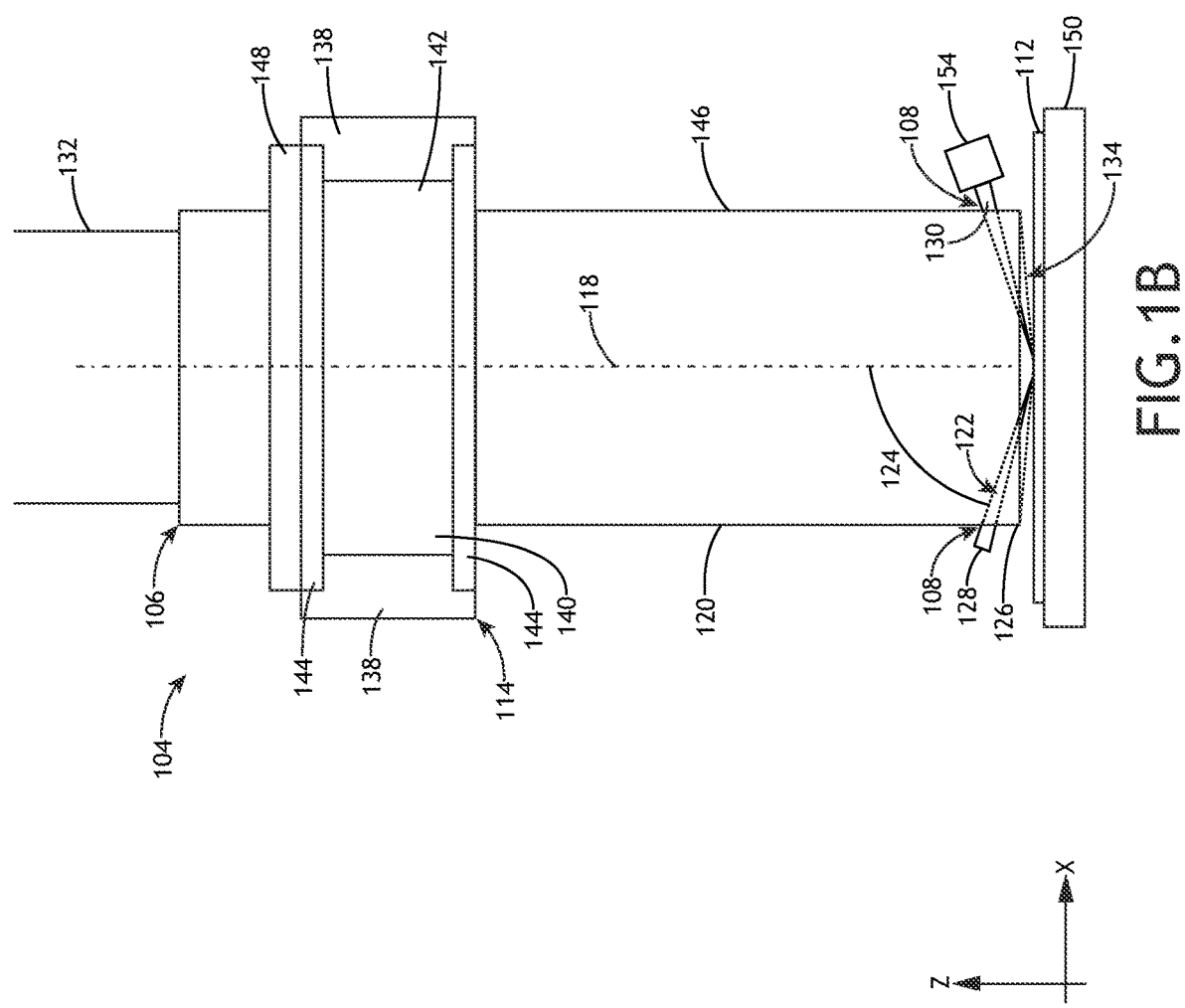

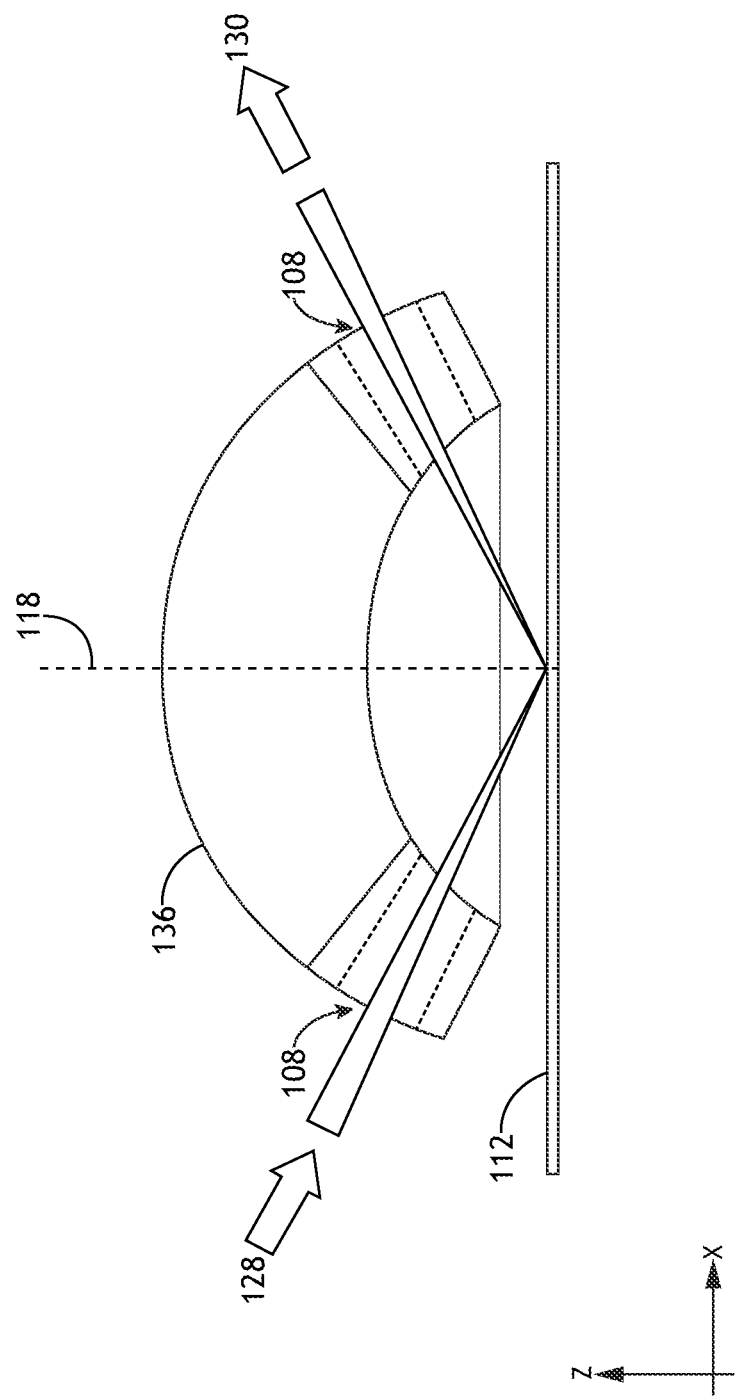

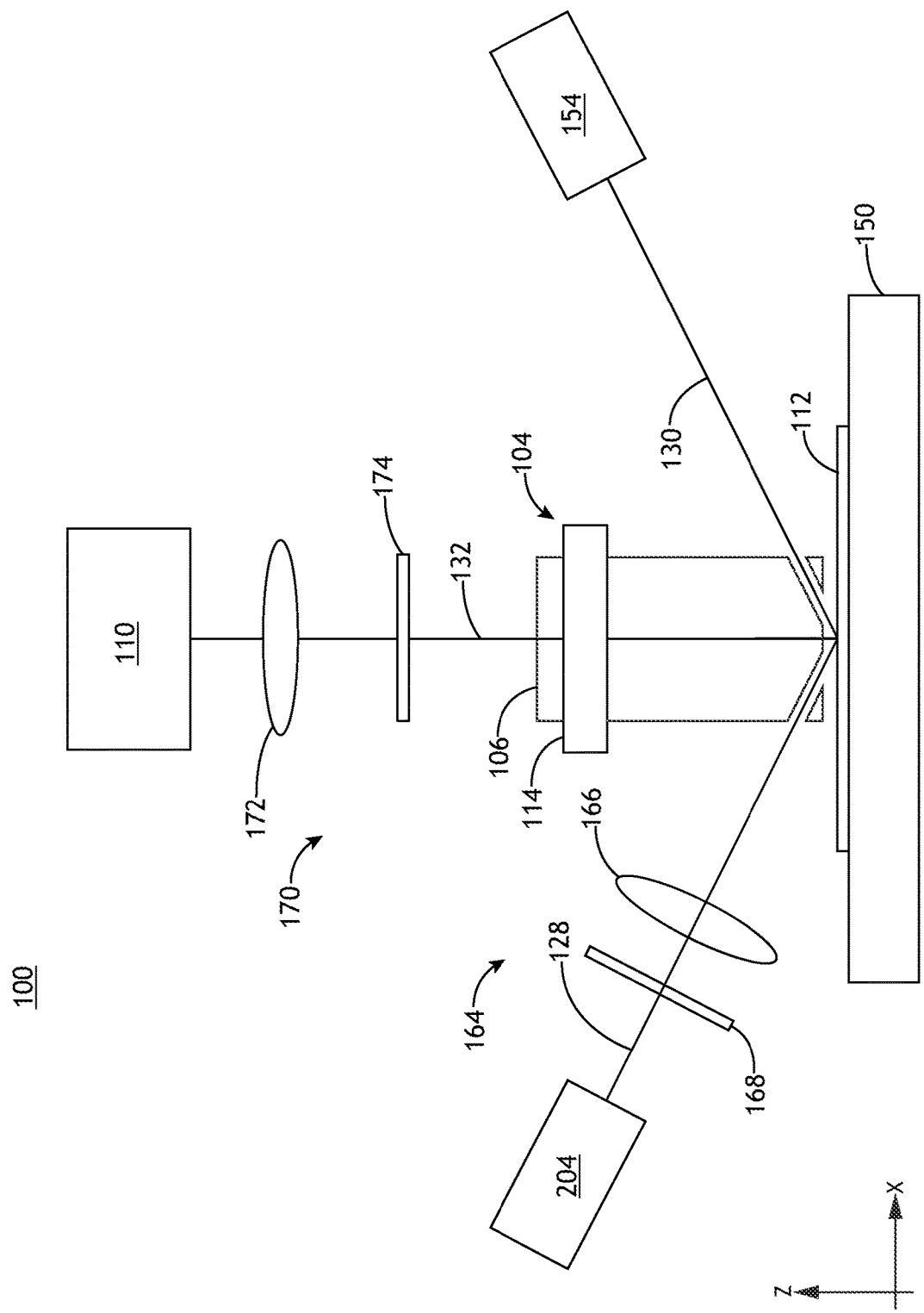

APPARATUS AND METHOD FOR ROTATING AN OPTICAL OBJECTIVE

CROSS-REFERENCE TO RELATED APPLICATION

The present application claims the benefit under 35 U.S.C. § 119(e) of U.S. Provisional Application Ser. No. 63/025,192 filed May 15, 2020, entitled APPARATUS AND METHOD TO ROTATE AN OPTICAL OBJECTIVE, naming Anatoly Romanovsky, Jenn-Kuen Leong, Daniel Kavaldjiev, Chunhai Wang, Bret Whiteside, and Steve Xu as inventors, which is incorporated herein by reference in the entirety.

TECHNICAL FIELD

The present disclosure relates generally to optical metrology and, more particularly, to optical metrology using a rotating optical objective.

BACKGROUND

Dark-field optical inspection or metrology systems used in the semiconductor industry typically generate measurements based on collected light from a sample that excludes specular reflection of an illumination beam, where the specularly reflected illumination lies either outside of a collection numerical aperture (NA) or is blocked prior to reaching a detector. Further, many optical inspection or metrology techniques utilize measurements based on illumination of the sample with different azimuth angles.

In such systems, it is typically desirable to utilize an objective with a high collection NA to efficiently collect light from the sample over a wide range of angles. However, increasing the NA of an objective lens generally results in a decreasingly small gap between the sample and the objective lens, which may limit an ability to illuminate the sample with an incidence angle outside the collection NA. Further, dark-field measurements generated by blocking specularly-reflected illumination may suffer from unwanted scattering of specularly-reflected light by blocking elements. It is therefore desirable to provide systems and methods for dark-field illumination with high NA objective lenses.

SUMMARY

A dark-field optical system is disclosed in accordance with one or more illustrative embodiments of the present disclosure. In one illustrative embodiment, the system includes an illumination source. In another illustrative embodiment, the system includes a rotational objective lens assembly. In another illustrative embodiment, the rotational objective lens assembly includes a dark-field objective lens to collect measurement light from a sample within a collection numerical aperture, where the dark-field objective lens includes an entrance aperture and an exit aperture at symmetrically-opposed azimuth angles with respect to an optical axis of the dark-field objective lens. In another illustrative embodiment, the rotational objective lens assembly includes a rotational bearing to allow rotation of at least a part of the dark-field objective lens including the entrance aperture and the exit aperture around the optical axis. In another illustrative embodiment, the rotational objective lens assembly includes a rotational driver to control a rotational angle of the entrance aperture. In another illustrative embodiment, the system includes a multi-angle illumination sub-system to illuminate the sample with an illumination beam through the entrance aperture at two or more illumination azimuth angles, where a portion of the illumination beam reflected by the sample exits the objective lens through the exit aperture as a reflected illumination beam, and where an azimuth angle of the illumination beam on the sample is selectable by rotating the objective lens to any of the two or more illumination azimuth angles using the rotational objective lens assembly. In another illustrative embodiment, the system includes a collection sub-system configured to collect direct at least a portion of the measurement light from the dark-field objective lens to one or more detectors.

A rotational objective lens assembly is disclosed in accordance with one or more illustrative embodiments of the present disclosure. In one illustrative embodiment, the rotational objective lens assembly includes a dark-field objective lens to collect measurement light from a sample within a collection numerical aperture, where the objective lens includes an entrance aperture and an exit aperture at symmetrically-opposed azimuth angles with respect to an optical axis of the dark-field objective lens, and where the objective lens is configured to accept an illumination beam through the entrance aperture, wherein a portion of the illumination beam reflected by the sample exits the objective lens through the exit aperture as a reflected illumination beam. In another illustrative embodiment, the rotational objective lens assembly includes a rotational bearing to allow rotation of at least a part of the dark-field objective lens including the entrance aperture and the exit aperture around the optical axis. In another illustrative embodiment, the rotational objective lens assembly includes a rotational driver to control a rotational angle of the entrance aperture, where an azimuth angle of the illumination beam on the sample is selectable by rotating the objective lens to a selected rotation angle using the rotational objective lens assembly.

A dark-field measurement method is disclosed in accordance with one or more illustrative embodiments of the present disclosure. In one illustrative embodiment, the method includes aligning a sample to a field of view of a dark-field objective lens, where the dark-field objective lens includes an entrance aperture and an exit aperture at symmetrically-opposed azimuth angles with respect to an optical axis of the dark-field objective lens. In another illustrative embodiment, the method includes rotating the objective lens to align the entrance aperture along a selected azimuth angle for a measurement. In another illustrative embodiment, the method includes illuminating the sample with an illumination beam through the entrance aperture at the selected azimuth angle, where a portion of the illumination beam reflected by the sample exits the dark-field objective lens through the exit aperture as a reflected illumination beam. In another illustrative embodiment, the method includes collecting measurement light from the sample within a collection numerical aperture of the dark-field objective lens. In another illustrative embodiment, the method includes generating one or more measurements associated with the sample based on the measurement light.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 1B is a conceptual profile view of a dark-field objective lens illustrating illumination and collection pathways for a dark-field measurement, in accordance with one or more embodiments of the present disclosure.

FIG. 1E is a cross-section view of a lens element of a dark-field aperture including two dark-field apertures to provide a dark-field illumination path within a collection NA in accordance with one or more embodiments of the present disclosure.

FIG. 1G is a conceptual diagrammatic view of a dark-field optical system illustrating a single illumination source providing illumination at a single azimuth angle, in accordance with one or more embodiments of the present disclosure.

DETAILED DESCRIPTION

Figure 1A:
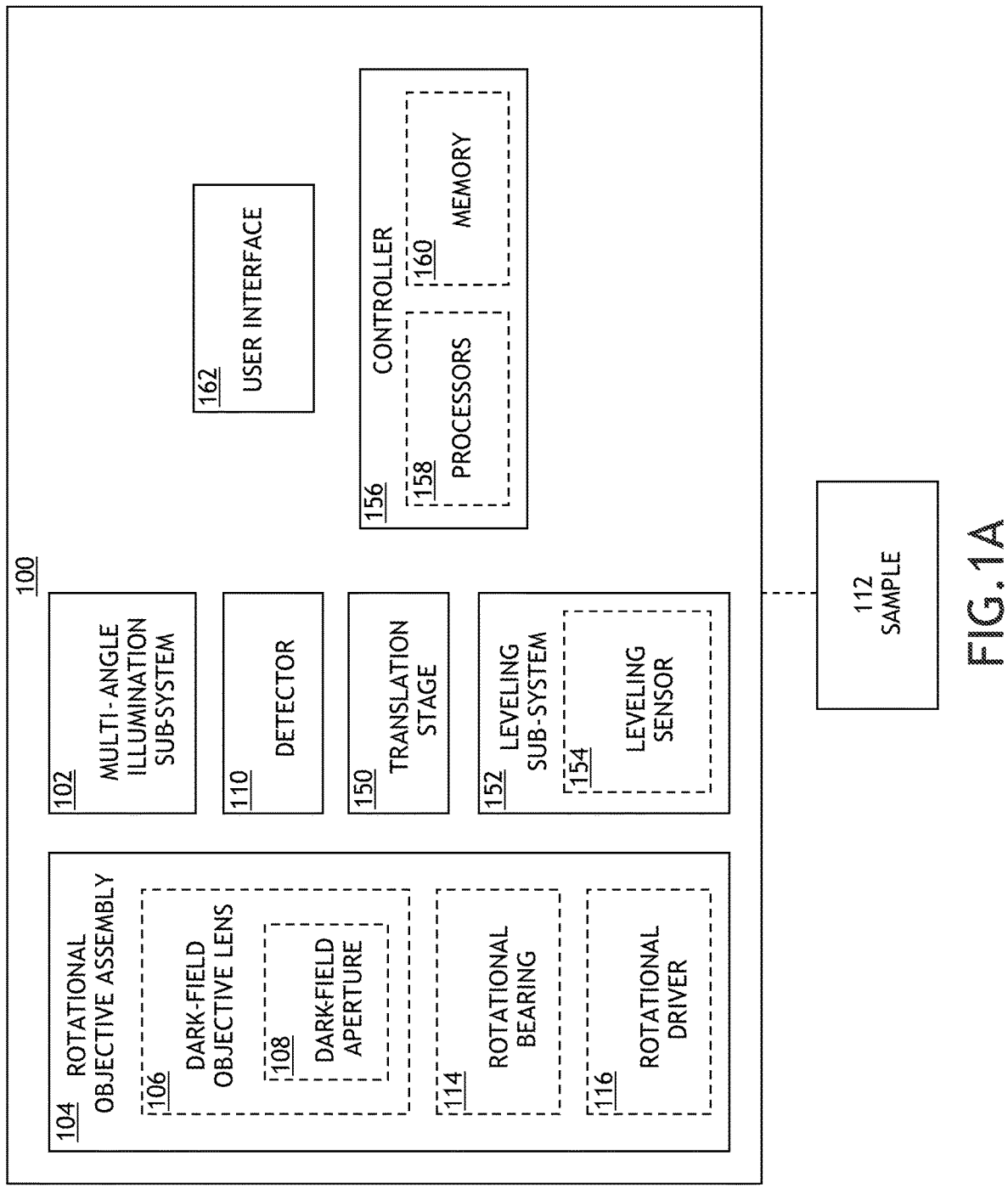
FIG. 1A is a conceptual block diagram illustrating a dark-field optical system in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for a rotating objective lens assembly suitable for dark-field optical measurements with selectable azimuth incidence angles.

Dark-field optical measurements may generally be performed by illuminating a sample with an illumination beam, often having a limited angular extent, and generating a measurement based on light emanating from the sample at angles excluding specular reflection of the illumination beam. The measurement is thus sensitive to scattered and/or diffracted light. For example, a dark-field image may generally contain no signal (or a "dark" signal) when the sample is smooth and may show a pronounced signal in the presence of scattering or diffraction. As a result, dark-field optical measurements are commonly used, but are not limited to, inspection and/or metrology of semiconductor devices at various stages of fabrication.

In a general sense, a dark-field configuration may be obtained by either not collecting the specularly-reflected illumination beam or by inserting one or more elements into a collection arm to block, redirect, or otherwise prevent the specularly-reflected illumination beam from reaching a detector. For example, collection of the specularly-reflected light may be avoided by illuminating the sample outside of a collection numerical aperture (NA) of the system (e.g., of an objective lens used to collect light from the sample) such that the portion of the illumination beam that is specularly reflected will also lie outside of the collection NA. By way of another example, specularly-reflected illumination that is collected by the system may be blocked or redirected by apertures or mirrors, commonly placed at a pupil plane.

It is contemplated herein that avoiding the collection of specularly-reflected light may be preferable for certain applications requiring high sensitivity such as, but not limited to, defect inspection on smooth unpatterned wafers using high-intensity illumination to provide measurable signals from small defects. For example, blockers or other elements intended to block or redirect high-intensity specular reflection may nonetheless generate unwanted scattering that may decrease the sensitivity of the measurement. This source of noise is not present when the specularly-reflected illumination is simply not collected.

However, a configuration in which the illumination and the specularly-reflected illumination are completely outside the collection NA of the system may limit the achievable collection NA. For example, as the collection NA of an objective lens is increased, the clearance between the objective and the sample generally decreases. As the NA approaches 1 in air, illumination of the sample with angles outside of the collection NA becomes increasingly difficult and sometimes impractical.

Embodiments of the present disclosure are directed to dark-field objective lens (e.g., a dark-field objective) with at least one pair of dark-field apertures at symmetrically-opposed azimuth angles around a central optical axis. Such a dark-field objective may collect light from the sample within a collection numerical aperture (NA) and may further include the dark-field apertures to provide a path for an illumination beam to reach the sample and a path for specularly reflected portions of the illumination beam to exit the dark-field objective. In this way, the specularly reflected light from the sample is not collected by the dark-field objective and dark-field operation is achieved without the need to block the reflected illumination, which eliminates noise from spurious reflections of the reflected illumination beam by beam blockers in the system. For example, a pair of dark-field apertures may include an entrance aperture and an exit aperture at symmetrically-opposed azimuth angles. The entrance and exit apertures may have, but are not required to have, the same polar angle (e.g., measured with respect to the optical axis) or altitude angle (e.g., measured with respect to a plane normal to the optical axis). For instance, entrance and exit apertures with common polar angles may be suitable for use with a flat and leveled sample. However, it may be desirable to have an exit aperture at a different polar angle or with a different shape (e.g., elongated shape) to accommodate specular reflections from non-flat or unleveled samples.

In some embodiments, the dark-field apertures are arranged such that the paths of the illumination beam and the specularly-reflected beam lie outside the collection NA. For example, the dark-field apertures may provide a path through a portion of the housing that would otherwise be inaccessible. In some embodiments, the dark-field apertures are arranged such that the paths of the illumination beam and the specularly-reflected beam lie within the collection NA. In this configuration, the collection NA is slightly reduced at the azimuth angles associated with the dark-field apertures. However, this configuration may allow for increased (e.g., maximized) collection NA in other azimuth angles to improve the overall sensitivity. This configuration may also collect scattered light at angles near the specular reflection angle and may thus be highly sensitive to many small defects that induce only minor deviations of the illumination.

It is further contemplated herein that it may be desirable to provide dark-field measurements at multiple azimuth angles using such a dark-field objective. For example, when inspecting surfaces other than a bare semiconductor wafer, surface roughness may become a dominant noise source such that laser illumination may induce a speckle pattern (e.g., at a detector plane) that may reduce the contrast and limit the measurement sensitivity. However, this speckle-induced contrast reduction may be overcome by averaging multiple measurements (with associated speckle patterns) generated with illumination at different azimuth angles. Multi-directional illumination is generally described in U.S. Pat. No. 9,176,072 issued on Nov. 3, 2015 and U.S. Pat. No. 10,739,275 issued on Aug. 11, 2020, both of which are incorporated herein by reference in its entirety.

In a general sense, a dark-field objective may have any number of dark-field apertures to provide for illumination at multiple azimuth or polar angles. However, increasing a number of dark-field apertures may also increase cost, fabrication complexity, decrease the collection NA, and may increase the potential for unwanted scattering. In some embodiments, a dark-field measurement system includes a rotational bearing to provide for rotation of a dark-field objective to align a dark-field aperture (e.g., an entrance aperture) to selected azimuth angles to enable measurements at the selected azimuth angles. In this way, multiple measurements with illumination from multiple azimuth angles may be achieved using a dark-field objective with a single pair of symmetrically-opposed dark-field apertures. Further, such a system may be suitable for highly-sensitive measurements on a wide range of samples with varying surface smoothness.

Additional embodiments of the present disclosure are directed to a dark-field measurement system including a rotating objective lens assembly and a multi-angle illumination sub-system for illuminating the sample at selected azimuth angles. In one embodiment, the multi-angle measurement sub-system includes static illumination components arranged at fixed azimuth angles. In this way, measurements at the fixed azimuth angles may be provided by rotating the dark-field objective to align the dark-field apertures to the fixed azimuth angles. In another embodiment, the multi-angle illumination sub-system includes rotatable illumination components. For example, the multi-angle illumination sub-system may include one or more beam-delivery components (e.g., an optical fiber, free-space components, or the like) that may maintain alignment with the entrance aperture as the dark-field objective is rotated. In this way, measurements may be performed at any selected azimuth angle.

Additional embodiments of the present disclosure are directed to a sample leveling sub-system for leveling a sample with respect to a pair of dark-field apertures. The leveling sub-system may adjust the position and/or tilt of the sample to provide that specular reflection of an illumination beam through an entrance aperture is accurately aligned with an exit aperture to mitigate potential noise due to scattering of the reflection of the illumination beam on a portion of the objective lens when not aligned. For example, a leveling sub-system may include a leveling sensor to monitor the reflection of the illumination beam and an adjustable sample stage for adjusting at least a tip or a tilt of a sample as needed.

Referring now to FIGS. 1A-3, systems and methods for metrology at selected azimuth angles with a rotatable objective lens are described in greater detail in accordance with one or more embodiments of the present disclosure.

FIG. 1A is a conceptual block diagram illustrating a dark-field optical system 100 in accordance with one or more embodiments of the present disclosure.

In one embodiment, the dark-field optical system 100 includes a multi-angle illumination sub-system 102 providing illumination at two or more azimuth angles, a rotational objective lens assembly 104 to rotate a dark-field objective lens 106 with at least one pair of symmetrically-opposed dark-field apertures 108 to align with the multi-angle illumination sub-system 102, and a detector 110 to capture light from the sample 112 collected within a collection NA of the dark-field objective lens 106. For example, a symmetrically-opposed pair of dark-field apertures 108 may include an entrance aperture providing an unobstructed path for illumination from the multi-angle illumination sub-system 102 to the sample 112 and an exit aperture providing an unobstructed path for a portion of the illumination that is reflected by the sample 112.

A dark-field measurement may be performed with illumination from any azimuth angle addressable by the multi-angle illumination sub-system 102 by rotating the dark-field objective lens 106 with the rotational objective lens assembly 104 to align a dark-field aperture 108 operating as an entrance aperture of the dark-field objective lens 106 to the selected azimuth angle and collecting the associated measurement light. For example, the rotational objective lens assembly 104 may include a rotational bearing 114 and an associated rotational driver 116 to drive or otherwise control the rotation of the dark-field objective lens 106.

Figure 1C:
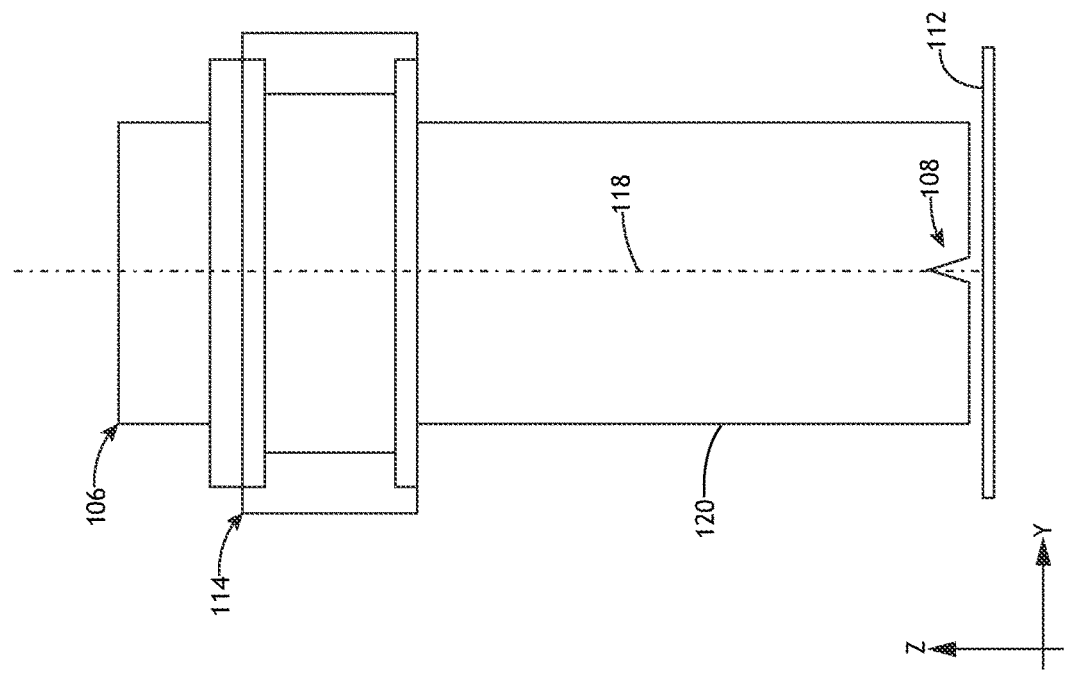
FIG. 1C is a conceptual profile view of a dark-field objective lens formed as a hole in the housing in accordance with one or more embodiments of the present disclosure.
Figure 1D:
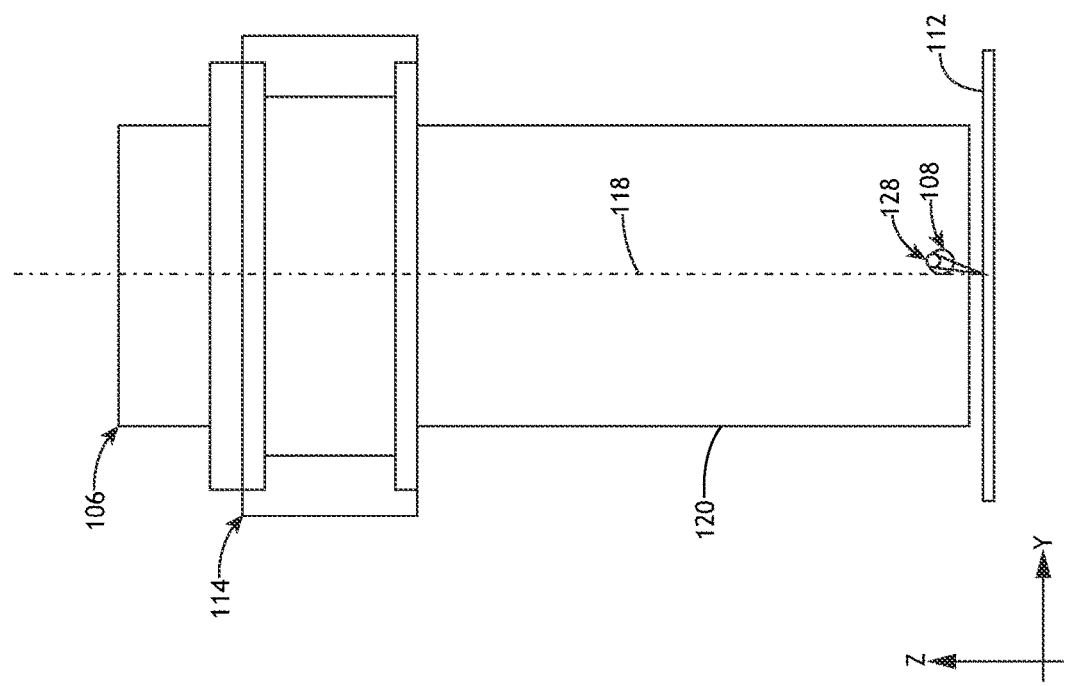
FIG. 1D is a conceptual profile view of a dark-field objective lens formed as a notch in the housing in accordance with one or more embodiments of the present disclosure.

Referring now to FIGS. 1B-1F, various non-limiting configurations and designs of a dark-field objective lens 106 are described in accordance with one or more embodiments of the present disclosure. FIG. 1B is a conceptual profile view of a dark-field objective lens 106 illustrating illumination and collection pathways for a dark-field measurement, in accordance with one or more embodiments of the present disclosure. FIGS. 1C-1D are conceptual profile views of the dark-field objective lens 106 of FIG. 1B rotated by 90 degrees around its optical axis 118 to illustrate various non-limiting designs of a dark-field aperture 108.

In one embodiment, a dark-field aperture 108 is formed as a clearing in a housing 120 of the dark-field objective lens 106 providing an unobstructed dark-field illumination path 122 to or from the sample 112 at a selected polar angle 124. For example, as illustrated in FIG. 1B, a dark-field aperture 108 may extend from an outer diameter of the housing 120 to a measurement end 126 of the housing 120 near the sample 112. FIG. 1B further illustrates a pair of a symmetrically-opposed dark-field apertures 108 (here distributed along the X axis) to provide a dark-field illumination path 122 for both an illumination beam 128 and a reflected illumination beam 130 (e.g., a portion of the illumination beam 128 reflected by the sample 112). In this configuration, a dark-field illumination path 122 may intersect with the optical axis 118 at a working distance of the dark-field objective lens 106 (e.g., a location at which the sample 112 is placed). Upon illumination of the sample 112 with the illumination beam 128, measurement light 132 (e.g., scattered and/or diffracted light) may be collected within the collection NA 134 of the dark-field objective lens 106.

A dark-field aperture 108 may have any shape, configuration, or design suitable for providing an unobstructed dark-field illumination path 122 through at least as portion of the housing 120 of the dark-field objective lens 106 such as, but not limited to, a hole, a notch, or an indentation. FIG. 1C is a conceptual profile view of a dark-field objective lens 106 formed as a hole in the housing 120 in accordance with one or more embodiments of the present disclosure. Such a hole may be formed by means of fabrication such as, but not limited to, drilling. Further, such a hole may have any selected diameter or a varying diameter along the dark-field illumination path 122. For instance, the dark-field aperture 108 may have, but is not required to have, a diameter that increases as a function of the radial position to approximate a varying diameter of a focused illumination beam 128 or a diverging reflected illumination beam 130. Although illustrated as a circular hole, the dark-field aperture 108 may generally have any shape. FIG. 1D is a conceptual profile view of a dark-field objective lens 106 formed as a notch in the housing 120 in accordance with one or more embodiments of the present disclosure. Additionally, a dark-field aperture 108 configured for use as an entrance aperture may have the same or a different size and/or shape than one configured for use as an exit aperture. In this way, the size and/or shape may be tailored for a specific use or expected distribution of light. For instance, the size and/or shape of a dark-field aperture may be tailored to an expected distribution of scattered light from the sample 112 (e.g., a distribution of measurement light 132 from expected defect types, or the like).

A dark-field aperture 108 may be formed to provide a dark-field illumination path 122 at any selected polar angle 124 relative to the optical axis 118. In one embodiment, the polar angle 124 is configured to be within the collection NA 134 of the dark-field aperture 108. For example, the dark-field aperture 108 may include a clearing through the housing 120 as well as one or more lens elements of the dark-field aperture 108. FIG. 1E is a cross-section view of a lens element 136 of a dark-field aperture 108 including two dark-field apertures 108 to provide a dark-field illumination path 122 within a collection NA 134 in accordance with one or more embodiments of the present disclosure. It is contemplated herein that a dark-field illumination path 122 with a polar angle 124 within the collection NA 134 may facilitate the collection of measurement light 132 at angles near the illumination beam 128 and/or the reflected illumination beam 130. As a non-limiting example, when used for defect inspection, certain defects such as, but not limited to, shallow bumps, divots, or scratches may scatter light close to the reflected illumination beam 130. Accordingly, dark-field apertures 108 providing a dark-field illumination path 122 with a polar angle 124 within the collection NA 134 may facilitate collection of the measurement light 132 associated with such defects and may thus provide sensitive detection of such defects. It is to be understood, however, that the illustration of the lens element 136 in FIG. 1D is provided solely for illustrative purposes and should not be interpreted as limiting. For example, a dark-field objective lens 106 may generally have any suitable design for collecting light within a selected collection NA 134. Accordingly, a dark-field aperture 108 may pass through any number of lens elements 136 or sub-elements thereof.

Figure 1F:
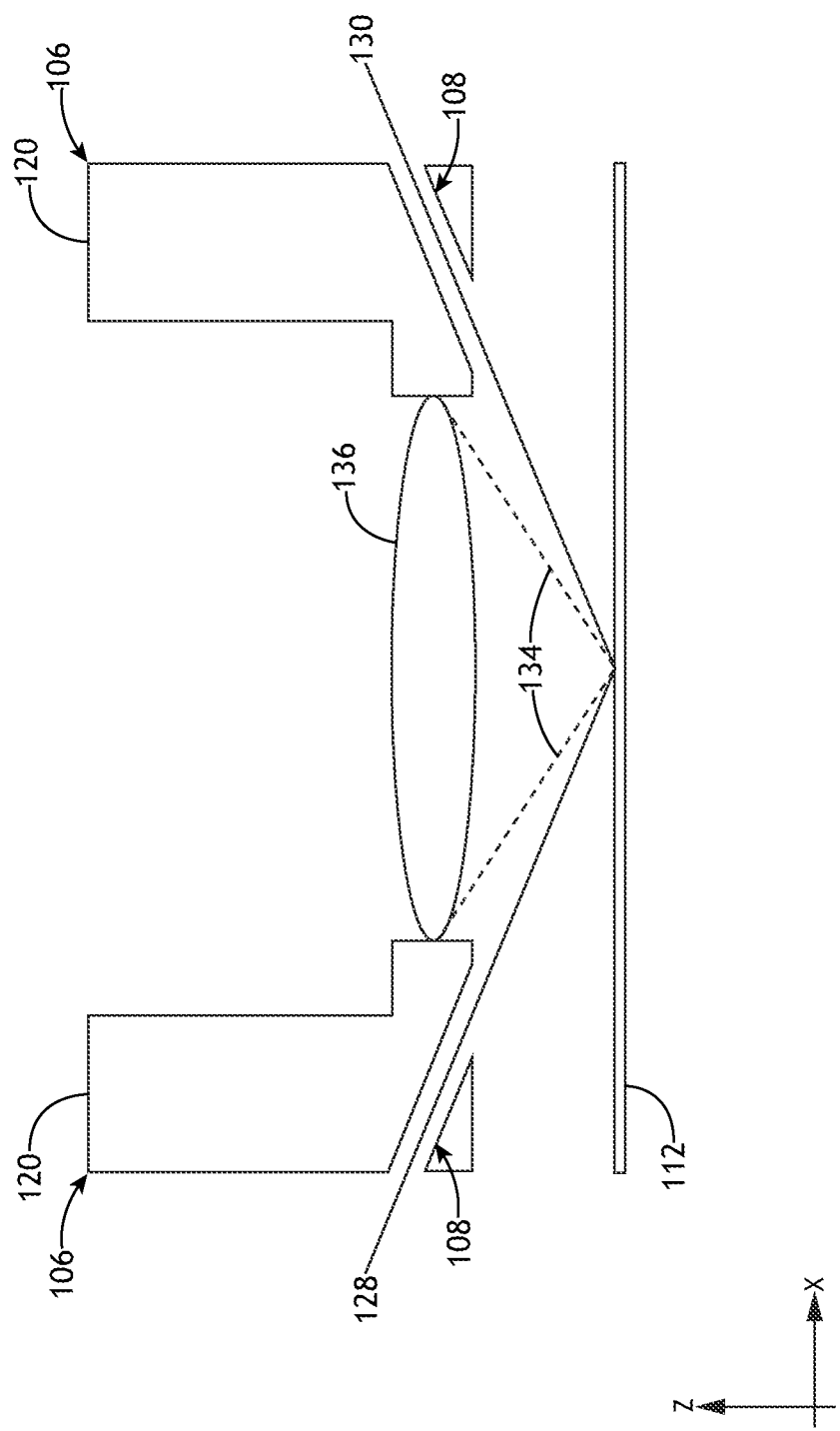
FIG. 1F is a profile view of a dark-field objective lens with a dark-field aperture formed as a hole through a portion of the housing to provide a dark-field illumination path outside the collection NA of the dark-field aperture, in accordance with one or more embodiments of the present disclosure.

In another embodiment, the polar angle 124 is configured to be outside the collection NA 134 of the dark-field aperture 108. In this way, the presence of a dark-field aperture 108 may not limit the collection NA 134. FIG. 1F is a profile view of a dark-field objective lens 106 with a dark-field aperture 108 formed as a hole through a portion of the housing 120 to provide a dark-field illumination path 122 outside the collection NA 134 of the dark-field aperture 108, in accordance with one or more embodiments of the present disclosure. However, it is to be understood that the illustration of the dark-field objective lens 106 in FIG. 1F is provided solely for illustrative purposes and should not be interpreted as limiting. Similar to the illustrations in FIGS. 1B and 1C, a dark-field aperture 108 formed through a housing 120 to provide a dark-field illumination path 122 outside the collection NA 134 may have any suitable size or shape including, but not limited to, a hole or a notch.

Referring again generally to FIGS. 1A-1F, the rotational objective lens assembly 104 is described in greater detail in accordance with one or more embodiments of the present disclosure.

In a general sense, a dark-field objective lens 106 may have any number of dark-field apertures 108, or symmetrically-opposed pairs thereof, at any number of azimuth or polar angles. However, it is contemplated herein that it may be desirable to simultaneously provide a measurement with illumination at a freely-selectable azimuth angle or multiple measurements with illumination at two or more selected azimuth angles while also limiting a number of dark-field apertures 108 in a dark-field objective lens 106. For example, it may be the case that increasing a number of dark-field apertures 108 may also increase the cost and/or complexity of fabricating the dark-field objective lens 106. By way of another example, a dark-field aperture 108 within the collection NA 134 (e.g., as described with respect to FIG. 1E) may necessarily limit the collection of measurement light 132 for at least the associated azimuth angles. In this way, increasing a number of dark-field apertures 108 may reduce measurement sensitivity due to the decreased signal. By way of another example, a dark-field aperture 108 may itself scatter or otherwise distort measurement light 132, which may introduce noise to a measurement.

Accordingly, a rotational bearing 114 in a rotational objective lens assembly 104 may rotate a dark-field objective lens 106 to align a dark-field aperture 108 to a selected azimuth angle for illumination of the sample 112. The rotational bearing 114 may include any component or number of components suitable for rotating a dark-field objective lens 106 around a central optical axis 118.

The rotational bearing 114 may include any type of bearing suitable for providing rotation of at least a portion of a dark-field objective lens 106 such as, but not limited to, a mechanical bearing (e.g., a mechanical ball bearing, or the like) or a non-contact bearing (e.g., an air bearing, a magnetic bearing, or the like). In one embodiment, the rotational bearing 114 includes a fixed portion 138 and a rotatable portion 140, where the rotatable portion is mounted to or integrated with the dark-field objective lens 106 and the fixed portion is suitable for securing the dark-field objective lens 106 within the dark-field optical system 100.

In one embodiment, the rotational bearing 114 is provided as a dedicated component separate from the dark-field objective lens 106. For example, the rotational bearing 114 may include or be formed as a rotational objective mount, where the rotatable portion is configured to accept and secure a dark-field objective lens 106 such that the entire dark-field objective lens 106 may be rotated. Further, the rotational bearing 114, or the various components thereof, may have any design suitable for securing or connecting to a dark-field objective lens 106. For instance, FIG. 1B illustrates a non-limiting configuration in which the rotatable portion 140 includes an inner ring 142 having a diameter equal to or larger than a diameter of the dark-field objective lens 106 and at least one lip 144 extending from the inner ring 142. In this configuration, the dark-field objective lens 106 may include a lower body 146 having a diameter equal to or smaller than the inner ring 142 of the rotational bearing 114 and a mounting extension 148 extending from the lower body 146 such that the mounting extension 148 of the dark-field objective lens 106 may rest on the lip 144. The inner ring 142 illustrated in FIG. 1B further includes two lips 144 on opposite ends of the inner ring 142. In this way, the fixed portion 138 may at least partially extend into a gap between the two lips 144 to provide mechanical stability. The dark-field objective lens 106 may be secured to the rotatable portion 140 (e.g., the inner ring 142) using any technique known in the art including, but not limited to, one or more set screws or a compression ring.

In another embodiment, at least a portion of the rotational bearing 114 is integrated with the dark-field objective lens 106. For example, the housing 120 of the dark-field objective lens 106, or a portion thereof, may be attached to or otherwise form the rotatable portion 140 of a rotational bearing 114. An additional portion of the housing 120 may then be attached to or otherwise form the fixed portion 138. In this configuration, the various drive components may also be integrated within the dark-field objective lens 106, coupled to the dark-field objective lens 106, or a combination thereof.

In another embodiment, the rotational objective lens assembly 104 includes a rotational driver 116 to drive the rotational bearing 114. For example, the rotational driver 116 may include, but is not limited to, one or more gears to drive a mechanical bearing, magnetic drivers to rotate magnetic bearings, or the like. The rotational driver 116 may further include one or more actuators, drivers, and/or control circuitry to control the motion and position of the dark-field objective lens 106. In a general sense, any means of rotating at least a portion of a dark-field objective lens 106 to align a dark-field aperture 108 (e.g., an entrance aperture) to a selected azimuth angle for a measurement is within the spirit and scope of the present disclosure.

Figure 2A:
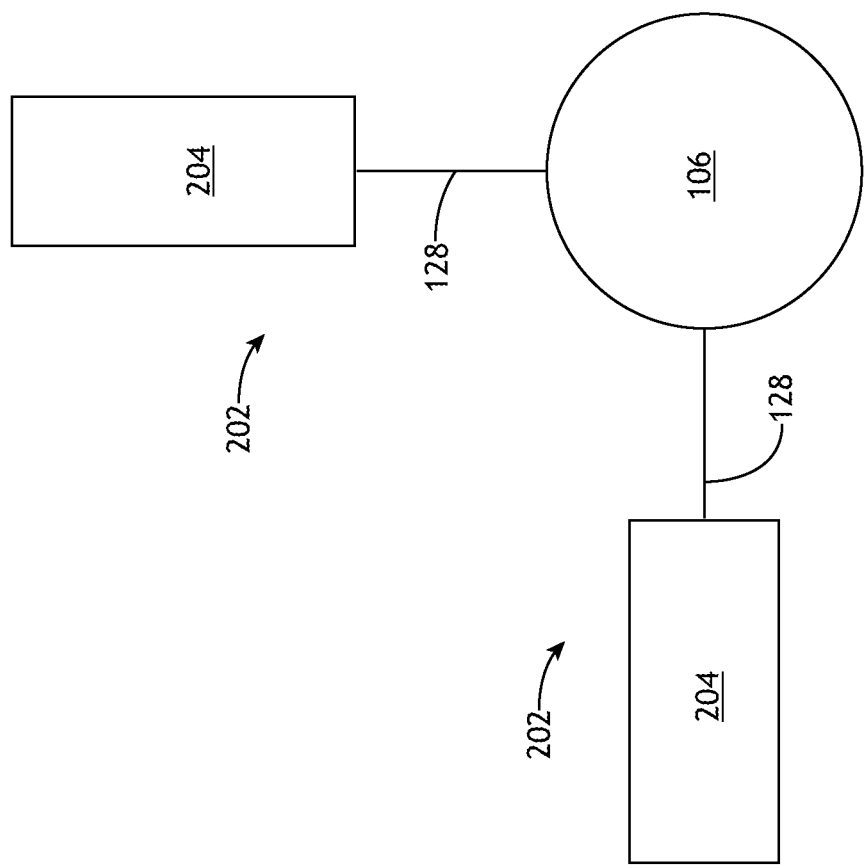
FIG. 2A is a top conceptual view of a dark-field optical system including two illumination channels providing illumination beams at two azimuth angles separated by 90 degrees in accordance with one or more embodiments of the present disclosure.
Figure 2B:
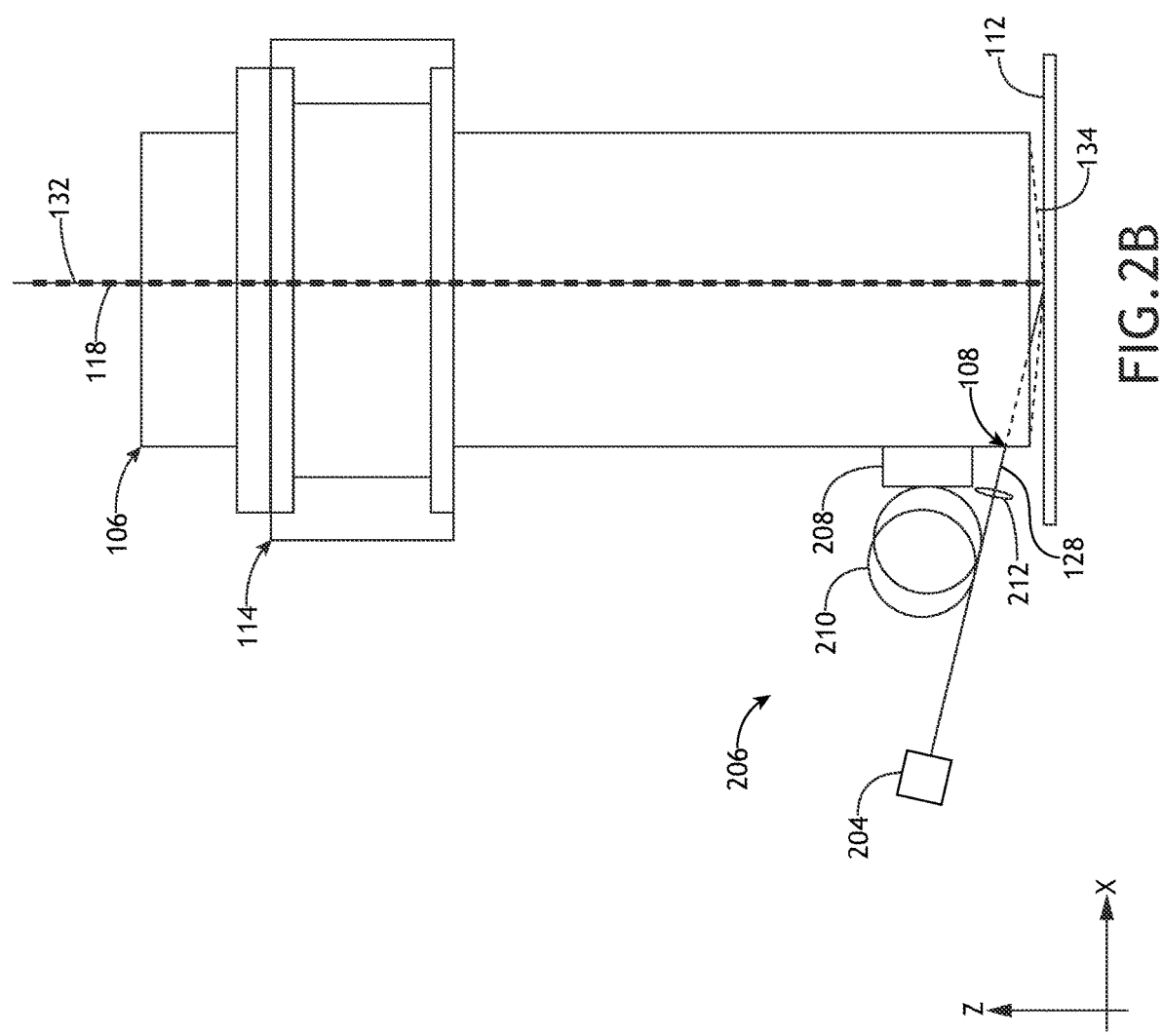
FIG. 2B is profile conceptual view of a multi-angle illumination sub-system including a rotatable illumination channel in accordance with one or more embodiments of the present disclosure.

Referring now to FIGS. 2A and 2B, the multi-angle illumination sub-system 102 is described in greater detail in accordance with one or more embodiments of the present disclosure.

In one embodiment, the multi-angle illumination sub-system 102 includes two or more fixed-angle illumination channels 202 oriented to provide an illumination beam 128 at one or more fixed azimuth angles such as, but not limited to, 45 degrees, 90 degrees, or 180 degrees. FIG. 2A is a top conceptual view of a dark-field optical system 100 including two illumination channels 202 providing illumination beams 128 at two azimuth angles separated by 90 degrees in accordance with one or more embodiments of the present disclosure. In this configuration, dark-field measurements based on illumination along the X and Y directions may be efficiently generated with a dark-field objective lens 106 including a single pair of dark-field apertures 108 (e.g., entrance and exit apertures) by sequentially rotating the dark-field objective lens 106 to the two azimuth angles and collecting measurement light 132 at each angle for a measurement.

In another embodiment, the multi-angle illumination sub-system 102 includes at least one illumination source 204 to generate an illumination beam 128. In one embodiment, each illumination channel 202 includes a separate illumination source 204. In another embodiment, an illumination source 204 provides an illumination beam 128 to two or more illumination channels 202.

The illumination source 204 may include any type of illumination source suitable for providing at least one illumination beam 128. The illumination beam 128 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 204 may further generate an illumination beam 128 including any range of selected wavelengths. In another embodiment, the illumination source 204 may include a spectrally-tunable illumination source to generate an illumination beam 128 having a tunable spectrum.

In one embodiment, the illumination source 204 is a laser source. For example, the illumination source 204 may include, but is not limited to, one or more narrowband laser sources, a broadband laser source, a supercontinuum laser source, a white light laser source, or the like. In this regard, the illumination source 204 may provide an illumination beam 128 having high coherence (e.g., high spatial coherence and/or temporal coherence). In another embodiment, the illumination source 204 includes a laser-sustained plasma (LSP) source. For example, the illumination source 204 may include, but is not limited to, a LSP lamp, a LSP bulb, or a LSP chamber suitable for containing one or more elements that, when excited by a laser source into a plasma state, may emit broadband illumination. In another embodiment, the illumination source 204 includes a lamp source. For example, the illumination source 204 may include, but is not limited to, an arc lamp, a discharge lamp, an electrodeless lamp, or the like. In this regard, the illumination source 204 may provide an illumination beam 128 having low coherence (e.g., low spatial coherence and/or temporal coherence).

The illumination source 204 may further produce an illumination beam 128 having any temporal profile. For example, the illumination source 204 may produce a continuous illumination beam 128, a pulsed illumination beam 128, or a modulated illumination beam 128. Additionally, the illumination beam 128 may be delivered from the illumination source 204 via free-space propagation or guided light (e.g., an optical fiber, a light pipe, or the like).

FIG. 2B is profile conceptual view of a multi-angle illumination sub-system 102 including a rotatable illumination channel 202 in accordance with one or more embodiments of the present disclosure. In one embodiment, a rotatable illumination channel 202 includes one or more rotatable beam-delivery optics 206 aligned to direct an illumination beam 128 through a dark-field aperture 108 (e.g., an entrance aperture) regardless of the azimuth angle of the dark-field objective lens 106. For example, the rotatable beam-delivery optics 206, or a portion thereof, may be secured to a rotating portion of the dark-field objective lens 106 (e.g., with mount 208). In this configuration, a dark-field measurement may be performed with illumination at any selected azimuth angle by rotating the dark-field objective lens 106 and the rotatable beam-delivery optics 206 to the selected azimuth angle, directing an illumination beam 128 to the sample 112 at the selected azimuth angle, and collecting measurement light 132 within the collection NA 134 of the dark-field objective lens 106.

The rotatable beam-delivery optics 206 may include any optical elements known in the art suitable for directing an illumination beam 128 through a dark-field aperture 108 at any selected azimuth angle. Further, the rotatable beam-delivery optics 206 may include or receive an illumination beam 128 from an illumination source 204 that may be fixed relative to the dark-field objective lens 106 or may rotate along with the dark-field objective lens 106. For example, FIG. 2B illustrates a non-limiting configuration of the rotatable beam-delivery optics 206 including an optical fiber 210 and an output focuser 212 that may accept an illumination beam 128 from the illumination source 204 and direct the illumination beam 128 through a dark-field aperture 108.

It is to be understood, however, that FIGS. 2A and 2B are provided solely for illustrative purposes and should not be interpreted as limiting. For example, the dark-field optical system 100 may include any number of dedicated illumination channels 202 or any number of fixed-angle illumination channels 202. Further, although FIG. 2B illustrates only the illumination beam 128, it is to be understood that the dark-field objective lens 106 in FIG. 2B may include an additional dark-field aperture 108 through which the reflected illumination beam 130 may propagate (e.g., as illustrated in FIG. 1B).

Referring again to FIGS. 1A-1B, various additional components of the dark-field optical system 100 are described in greater detail in accordance with one or more embodiments of the present disclosure.

In one embodiment, the leveling sub-system 152 includes a sample stage 150 suitable for adjusting at least the angular position (e.g., tip and tilt) of the sample 112. In this way, the angular position of the sample 112 may be adjusted to provide that the reflected illumination beam 130 exits the dark-field objective lens 106 through a dark-field aperture 108 (e.g., an exit aperture) prior to a measurement. For example, the top surface of the sample 112 may be curved (intentionally or unintentionally), patterned, or otherwise deviated from a nominal state such that the sample 112 may need to be precisely aligned prior to a measurement to ensure that the reflected illumination beam 130 exits the dark-field objective lens 106 through a dark-field aperture 108.

In one embodiment, the dark-field optical system 100 includes a leveling sub-system 152 to monitor and control the angular position of the sample 112 to provide that the reflected illumination beam 130 exits the dark-field objective lens 106 through a dark-field aperture 108 using an automated process. For example, the leveling sub-system 152 may include a leveling sensor 154 to monitor the sample 112 and/or the reflected illumination beam 130.

In one embodiment, as illustrated in FIG. 1B, the leveling sensor 154 includes one or more optical detectors positioned to receive the reflected illumination beam 130 through the dark-field aperture 108. For example, the leveling sensor 154 may include a power-monitoring sensor to monitor a power of the reflected illumination beam 130 propagating through the dark-field aperture 108. In this way, the sample 112 may be aligned to provide a relative maximum power through the dark-field aperture 108. By way of another example, the leveling sensor 154 may include a position-sensitive optical detector. In this way, the position of the reflected illumination beam 130 may be monitored and the sample 112 may be aligned by providing that the reflected illumination beam 130 is positioned at suitable location.

In another embodiment, as further illustrated in FIG. 1B, the leveling sensor 154 may include one or more sample-position sensors such as, but not limited to, proximity or height sensors. In this way, the leveling sensor 154 may provide a measurement of the physical orientation of the sample 112 and the sample 112 may be aligned by orienting the sample 112 to a level position.

It is to be further understood that dark-field optical system 100 may include any number or type of leveling sensors 154 and that the above examples are provided solely for illustrative purposes and should not be interpreted as limiting.

In another embodiment, the dark-field optical system 100 includes a controller 156 communicatively coupled to one or more components of the dark-field optical system 100. In another embodiment, the controller 156 includes one or more processors 158. For example, the one or more processors 158 may be configured to execute a set of program instructions maintained in a memory device 160, or memory. The one or more processors 158 of a controller 156 may include any processing element known in the art. In this sense, the one or more processors 158 may include any microprocessor-type device configured to execute algorithms and/or instructions.

The one or more processors 158 of a controller 156 may include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 158 may include any device configured to execute algorithms and/or instructions (e.g., program instructions stored in memory). In one embodiment, the one or more processors 158 may be embodied as a desktop computer, mainframe computer system, workstation, image computer, parallel processor, networked computer, or any other computer system configured to execute a program configured to operate or operate in conjunction with the dark-field optical system 100, as described throughout the present disclosure. Moreover, different subsystems of the dark-field optical system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 156 may include one or more controllers housed in a common housing or within multiple housings. In this way, any controller or combination of controllers may be separately packaged as a module suitable for integration into dark-field optical system 100.

The memory device 160 may include any storage medium known in the art suitable for storing program instructions executable by the associated one or more processors 158. For example, the memory device 160 may include a non-transitory memory medium. By way of another example, the memory device 160 may include, but is not limited to, a read-only memory (ROM), a random-access memory (RAM), a magnetic or optical memory device (e.g., disk), a magnetic tape, a solid-state drive and the like. It is further noted that the memory device 160 may be housed in a common controller housing with the one or more processors 158. In one embodiment, the memory device 160 may be located remotely with respect to the physical location of the one or more processors 158 and the controller 156. For instance, the one or more processors 158 of the controller 156 may access a remote memory (e.g., server), accessible through a network (e.g., internet, intranet and the like).

The controller 156 may direct (e.g., through control signals) or receive data from any components of the dark-field optical system 100. The controller 156 may further be configured to perform any of the various process steps described throughout the present disclosure. For example, the controller 156 may direct the rotational objective lens assembly 104 to rotate the dark-field objective lens 106 to a selected azimuth angle, receive data from one or more leveling sensors 154, direct the sample stage 150 to orient the sample 112 such that the reflected illumination beam 130 exits the dark-field objective lens 106 through a dark-field aperture 108, receive measurement data from the detector 110, and/or generate metrology measurements based on the measurement data.

In one embodiment, the dark-field optical system 100 includes a user interface 162 communicatively coupled to the controller 156. In one embodiment, the user interface 162 may include, but is not limited to, one or more desktops, laptops, tablets, and the like. In another embodiment, the user interface 162 includes a display used to display data of the dark-field optical system 100 to a user. The display of the user interface 162 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 162 is suitable for implementation in the present disclosure. In another embodiment, a user may input selections and/or instructions responsive to data displayed to the user via a user input device of the user interface 162.

Referring now to FIGS. 1A and 1F, it is contemplated herein that the dark-field optical system 100 may include or be configured as any type of optical system known in the art. In one embodiment, the dark-field optical system 100 is an inspection system suitable for identifying and/or characterizing defects on a sample 112 such as, but not limited to, a bare semiconductor wafer, a wafer including one or more films, or a patterned wafer. In another embodiment, the dark-field optical system 100 is a metrology system suitable for generating one or more metrology measurements indicative of one or more aspects of the sample 112 such as, but not limited to, an overlay error between features on one or more sample layers, a thickness of a film layer, a composition of a film layer, or a critical dimension (CD) of one or more features.

Further, the dark-field optical system 100 may operate in an imaging or non-imaging mode. For example, a dark-field optical system 100 operating in an imaging mode may include at least one detector 110 suitable for capturing images, which may be located at any suitable plane in the dark-field optical system 100. For instance, a detector 110 located at a field plane may generate an image of one or more features on the sample 112. In another instance, a detector 110 at a pupil plane may generate images representative of an angular distribution of the measurement light 132 from the sample 112. By way of another example, a dark-field optical system 100 operating in a non-imaging mode may include one or more single-pixel detectors 110.

FIG. 1G is a conceptual diagrammatic view of a dark-field optical system 100 illustrating a single illumination source 204 providing illumination at a single azimuth angle, in accordance with one or more embodiments of the present disclosure.

In one embodiment, the illumination source 204 directs the illumination beam 128 to a sample 112 via an illumination pathway 164. The illumination pathway 164 may include one or more lenses 166 or additional illumination optical components 168 suitable for modifying and/or conditioning the illumination beam 128. For example, the one or more illumination optical components 168 may include, but are not limited to, one or more polarizers, one or more filters, one or more beam splitters, one or more diffusers, one or more homogenizers, one or more apodizers, one or more beam shapers, or one or more shutters (e.g., mechanical shutters, electro-optical shutters, acousto-optical shutters, or the like). By way of another example, the one or more illumination optical components 168 may include aperture stops to control the angle of illumination on the sample 112 and/or field stops to control the spatial extent of illumination on the sample 112. In one instance, the illumination pathway 164 includes an aperture stop located at a plane conjugate to the back focal plane of the dark-field objective lens 106 to provide telecentric illumination of the sample 112.

In another embodiment, the detector 110 is configured to capture the measurement light 132 through a collection pathway 170. For example, the collection pathway 170 may include the dark-field objective lens 106 and optionally one or more additional collection pathway lenses 172. In this regard, a detector 110 may receive radiation reflected or scattered (e.g. via specular reflection, diffuse reflection, and the like) from the sample 112 or generated by the sample 112 (e.g. luminescence associated with absorption of the illumination beam 128, or the like).

The collection pathway 170 may further include any number of collection optical components 174 to direct and/or modify illumination collected by the dark-field objective lens 106 including, but not limited to one or more collection pathway lenses 172, one or more filters, one or more polarizers, or one or more beam blocks. Additionally, the collection pathway 170 may include field stops to control the spatial extent of the sample 112 imaged onto the detector 110 or aperture stops to control the angular extent of illumination from the sample used to generate an image on the detector 110. In another embodiment, the collection pathway 170 includes an aperture stop located in a plane conjugate to the back focal plane of an optical element the dark-field objective lens 106 to provide telecentric imaging of the sample.

The detector 110 may include any type of optical detector known in the art suitable for measuring illumination received from the sample 112. For example, a detector 110 may include a sensor suitable for generating one or more images of a static sample 112 (e.g., in a static mode of operation) such as, but is not limited to, a charge-coupled device (CCD), a complementary metal-oxide-semiconductor (CMOS) sensor, a photomultiplier tube (PMT) array, or an avalanche photodiode (APD) array. Further, the detector 110 may include a multi-tap sensor having two or more taps per pixel including, but not limited to, a multi-tap CMOS sensor. In this regard, charge in a multi-tap pixel may be directed to any selected tap during an exposure window based on one or more drive signals to the pixel. Accordingly, a multi-tap sensor including an array of multi-tap pixels may generate multiple images, each associated with different taps of the associated pixels, during a single readout phase. Further, for the purposes of the present disclosure, a tap of a multi-tap sensor may refer to an output tap connected to the associated pixels. In this regard, reading out each tap of a multi-tap sensor (e.g., in a readout phase) may generate a separate image.

By way of another example, the detector 110 may include a sensor suitable for generating one or more images of a sample 112 in motion (e.g., a scanning mode of operation). For instance, the detector 110 may include a line sensor including a row of pixels. In this regard, the dark-field optical system 100 may generate a continuous image (e.g., a strip image) one row at a time by translating the sample 112 in a scan direction perpendicular to the pixel row through a measurement field of view and continuously clocking the line sensor during a continuous exposure window.

In another instance, the detector 110 may include a TDI sensor including multiple pixel rows and a readout row. The TDI sensor may operate in a similar manner as the line sensor, except that clocking signals may successively move charge from one pixel row to the next until the charge reaches the readout row, where a row of the image is generated. By synchronizing the charge transfer (e.g., based on the clocking signals) to the motion of the sample along the scan direction, charge may continue to build up across the pixel rows to provide a relatively higher signal to noise ratio compared to the line sensor.

In another embodiment, the detector 110 includes a spectroscopic detector suitable for identifying wavelengths of radiation emanating from the sample 112. In another embodiment, the dark-field optical system 100 may include multiple detectors 110.

Figure 3:
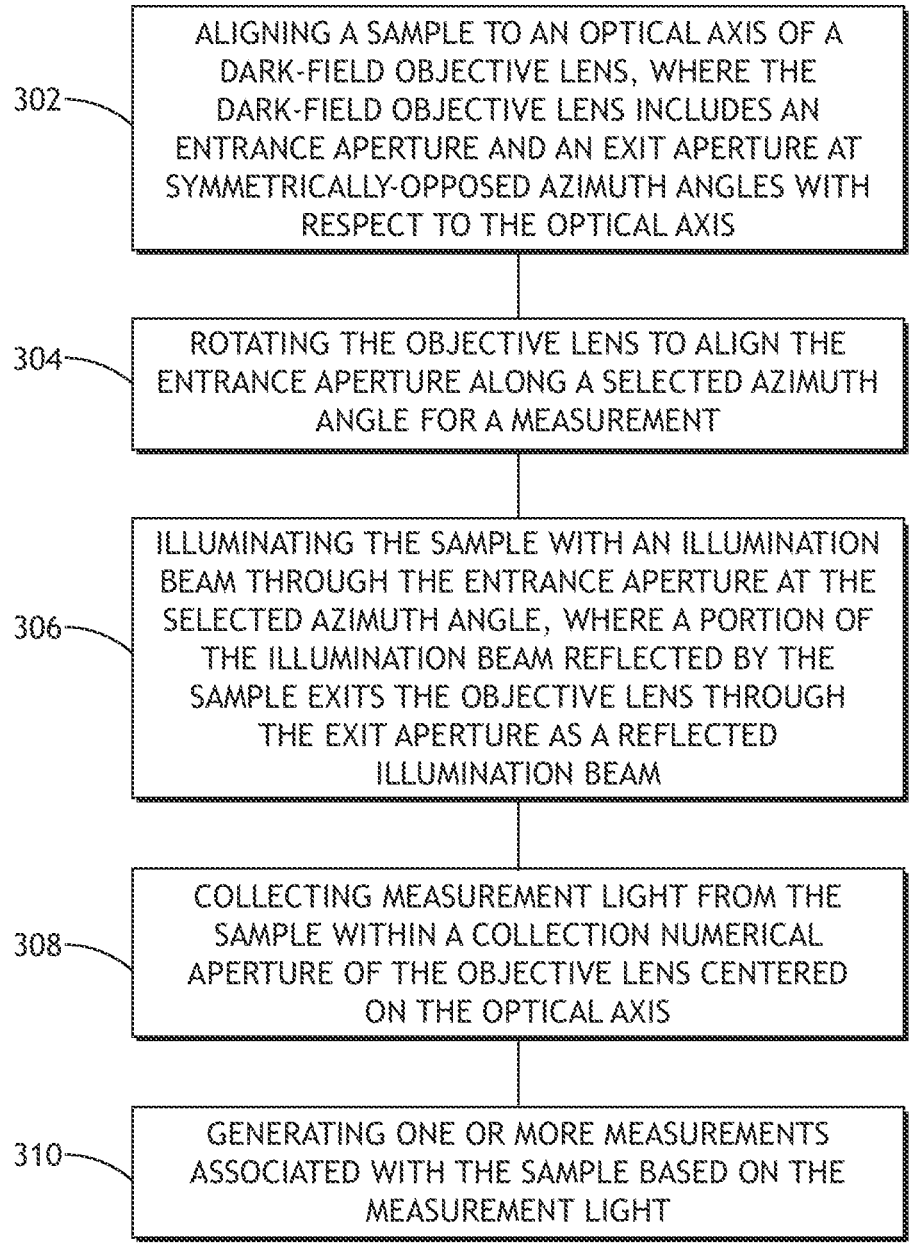
FIG. 3 is a flow diagram illustrating steps performed in a dark-field measurement method in accordance with one or more embodiments of the present disclosure.

Referring now to FIG. 3, FIG. 3 is a flow diagram illustrating steps performed in a dark-field measurement method 300 in accordance with one or more embodiments of the present disclosure. Applicant notes that the embodiments and enabling technologies described previously herein in the context of the dark-field optical system 100 should be interpreted to extend to the method 300. It is further noted, however, that the method 300 is not limited to the architecture of the dark-field optical system 100.

In one embodiment, the method 300 includes a step 302 of aligning a sample to an optical axis of a dark-field objective lens, where the dark-field objective lens includes an entrance aperture and an exit aperture at symmetrically-opposed azimuth angles with respect to the optical axis. For example, the step 302 may include aligning the sample such that a top surface of the sample is at a location of a working distance of the dark-field objective lens and is normal to the optical axis. In another embodiment, the method 300 includes a step 304 of rotating the objective lens to align the entrance aperture along a selected azimuth angle for a measurement. The dark-field objective may be rotated by any technique known the art such as, but not limited to, a rotational bearing 114 as disclosed with respect to the dark-field optical system 100. In another embodiment, the method 300 includes a step 306 of illuminating the sample with an illumination beam through the entrance aperture at the selected azimuth angle, where a portion of the illumination beam reflected by the sample exits the objective lens through the exit aperture as a reflected illumination beam. In this way, the reflected illumination beam may exit the dark-field objective lens without interacting with any components of the objective lens. It is contemplated herein that this technique may eliminate or at least mitigate undesirable scattering of the reflected illumination beam, which may facilitate highly-sensitive dark-field measurements. Further, the step 306 may be repeated to provide measurements at any number of selected azimuth angles. In another embodiment, the method 300 includes a step 308 of collecting measurement light from the sample within a collection numerical aperture of the objective lens which may be, but is not required to be, centered on the optical axis. In another embodiment, the method 300 includes a step 310 of generating one or more measurements associated with the sample based on the measurement light. For example, the measurements may include, but are not limited to, defect inspection or metrology measurements.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A dark-field optical system comprising:
   an illumination source;
   a rotational objective lens assembly comprising:
      a dark-field objective lens configured to collect measurement light from a sample within a collection numerical aperture, wherein the dark-field objective lens includes an entrance aperture and an exit aperture at symmetrically-opposed azimuth angles with respect to an optical axis of the dark-field objective lens;
      a rotational bearing to allow rotation of at least a part of the dark-field objective lens including the entrance aperture and the exit aperture around the optical axis; and
      a rotational driver to control a rotational angle of the entrance aperture;
   a multi-angle illumination sub-system configured to illuminate the sample with an illumination beam through the entrance aperture at any of two or more illumination azimuth angles, wherein a portion of the illumination beam reflected by the sample exits the dark-field objective lens through the exit aperture as a reflected illumination beam, wherein an azimuth angle of the illumination beam on the sample is selectable by rotating the dark-field objective lens to any of the two or more illumination azimuth angles using the rotational objective lens assembly; and a collection sub-system configured to direct at least a portion of the measurement light from the dark-field objective lens to one or more detectors.

2. The dark-field optical system of claim 1, wherein the entrance aperture provides a dark-field illumination path to the sample at a polar angle within the collection numerical aperture.

3. The dark-field optical system of claim 2, wherein the entrance aperture extends through a portion of a housing of the dark-field objective lens and at least one lens element of the dark-field objective lens.

4. The dark-field optical system of claim 1, wherein the entrance aperture provides a dark-field illumination path to the sample at a polar angle outside of the collection numerical aperture.

5. The dark-field optical system of claim 4, wherein the entrance aperture extends through a portion of a housing of the dark-field objective lens and at least one lens element of the dark-field objective lens.

6. The dark-field optical system of claim 1, wherein the measurement light comprises:

at least one of scattered or diffracted light from the sample.

7. The dark-field optical system of claim 1, wherein the multi-angle illumination sub-system comprises:

two or more illumination channels at two or more fixed azimuth angles relative to the optical axis, wherein the rotational driver is configured to selectively rotate the dark-field objective lens to align the entrance aperture to any of the two or more fixed azimuth angles for measurements using the two or more illumination channels.

8. The dark-field optical system of claim 1, wherein the multi-angle illumination sub-system comprises:

one or more rotatable beam-delivery optics aligned with the entrance aperture, wherein the one or more rotatable beam-delivery optics rotate with the dark-field objective lens.

9. The dark-field optical system of claim 8, wherein the one or more rotatable beam-delivery optics comprise:

an optical fiber aligned with the entrance aperture.

10. The dark-field optical system of claim 1, further comprising:

a controller communicatively coupled to the one or more detectors, the controller including one or more processors configured to execute program instructions causing the one or more processors to:

receive measurement data from the one or more detectors; and generate one or more measurements associated with the sample based on the measurement data.

11. The dark-field optical system of claim 10, further comprising:

a sample stage for adjusting an angular position of the sample.

12. The dark-field optical system of claim 11, further comprising:

a leveling sensor providing a measurement indicative of an angular position of the sample with respect to the optical axis, wherein the controller is configured to adjust a position of the sample stage during the measurement to provide that the portion of the illumination beam reflected by the sample exits the exit aperture based on the measurement from the leveling sensor.

13. The dark-field optical system of claim 12, wherein the leveling sensor comprises:

a sample-position sensor to provide a measurement of an angular position of the sample.

14. The dark-field optical system of claim 12, wherein the leveling sensor comprises:

one or more optical detectors positioned to receive the reflected illumination beam.

15. The dark-field optical system of claim 1, wherein the dark-field objective lens includes an additional entrance aperture and an additional exit aperture oriented at symmetric azimuth angles, wherein the multi-angle illumination sub-system is further configured to illuminate the sample through the additional entrance aperture.

16. The dark-field optical system of claim 1, wherein the rotational bearing comprises:

at least one of a ball bearing, an air bearing, or a magnetic bearing.

17. The dark-field optical system of claim 1, wherein the rotational bearing comprises:

a rotatable portion and a fixed portion.

18. The dark-field optical system of claim 17, wherein the dark-field objective lens is secured to the rotatable portion.

19. The dark-field optical system of claim 17, wherein a first portion of a housing of the dark-field objective lens includes the rotatable portion, wherein a second portion of the housing of the dark-field objective lens includes the fixed portion.

20. The dark-field optical system of claim 1, wherein at least one of the entrance aperture or the exit aperture comprises:

a hole.

21. The dark-field optical system of claim 1, wherein at least one of the entrance aperture or the exit aperture comprises:

a notch extending to an end of the dark-field objective lens facing the sample.

22. A rotational objective lens assembly comprising:

a dark-field objective lens configured to collect measurement light from a sample within a collection numerical aperture, wherein the dark-field objective lens includes an entrance aperture and an exit aperture at symmetrically-opposed azimuth angles with respect to an optical axis of the dark-field objective lens, wherein the dark-field objective lens is configured to accept an illumination beam through the entrance aperture, wherein a portion of the illumination beam reflected by the sample exits the dark-field objective lens through the exit aperture as a reflected illumination beam;

a rotational bearing to allow rotation of at least a part of the dark-field objective lens including the entrance aperture and the exit aperture around the optical axis; and a rotational driver to control a rotational angle of the entrance aperture, wherein an azimuth angle of the illumination beam on the sample is selectable by rotating the dark-field objective lens to a selected rotation angle using the rotational objective lens assembly.

23. The rotational objective lens assembly of claim 22, wherein the entrance aperture provides a dark-field illumination path to the sample at a polar angle within the collection numerical aperture.

24. The rotational objective lens assembly of claim 23, wherein the entrance aperture extends through a portion of a housing of the dark-field objective lens and at least one lens element of the dark-field objective lens.

25. The rotational objective lens assembly of claim 22, wherein the entrance aperture provides a dark-field illumination path to the sample at a polar angle outside of the collection numerical aperture.

26. The rotational objective lens assembly of claim 25, wherein the entrance aperture extends through a portion of a housing of the dark-field objective lens and at least one lens element of the dark-field objective lens.

27. The rotational objective lens assembly of claim 22, wherein the measurement light comprises:
at least one of scattered or diffracted light from the sample.

28. The rotational objective lens assembly of claim 22, wherein the rotational driver is configured to rotate the dark-field objective lens to any rotational angle.

29. The rotational objective lens assembly of claim 22, wherein a range of the rotational angles is 180 degrees.

30. The rotational objective lens assembly of claim 22, wherein a range of the rotational angles is 90 degrees.

31. The rotational objective lens assembly of claim 22, wherein the rotational bearing comprises:
at least one of a ball bearing, an air bearing, or a magnetic bearing.

32. The rotational objective lens assembly of claim 22, wherein the rotational bearing comprises:
a rotatable portion and a fixed portion.

33. The rotational objective lens assembly of claim 32, wherein the dark-field objective lens is secured to the rotatable portion.

34. The rotational objective lens assembly of claim 32, wherein a first portion of a housing of the dark-field objective lens includes the rotatable portion, wherein a second portion of the housing of the dark-field objective lens includes the fixed portion.

35. The rotational objective lens assembly of claim 22, wherein at least one of the entrance aperture or the exit aperture comprises:
a hole.

36. The rotational objective lens assembly of claim 22, wherein at least one of the entrance aperture or the exit aperture comprises:
a notch extending to an end of the dark-field objective lens facing the sample.

37. A dark-field measurement method comprising:
aligning a sample to a field of view of a dark-field objective lens of a rotational objective lens assembly, wherein the dark-field objective lens includes an entrance aperture and an exit aperture at symmetrically-opposed azimuth angles with respect to an optical axis of the dark-field objective lens;
rotating, with a rotational bearing and a rotational driver, the dark-field objective lens to align the entrance aperture along a selected azimuth angle for a measurement;
illuminating, with a multi-angle illumination sub-system, the sample with an illumination beam through the entrance aperture at the selected azimuth angle, wherein a portion of the illumination beam reflected by the sample exits the dark-field objective lens through the exit aperture as a reflected illumination beam;
collecting measurement light from the sample within a collection numerical aperture of the dark-field objective lens; and
generating one or more measurements associated with the sample based on the measurement light.

38. The dark-field measurement method of claim 37, wherein aligning the sample to the optical axis of the dark-field objective lens comprises:
leveling the sample to provide that the reflected illumination beam reflected exits the dark-field objective lens through the exit aperture.

\* \* \* \* \*